United States Patent [19]

Kawano

[11] Patent Number: 5,524,138
[45] Date of Patent: Jun. 4, 1996

[54] AUTOMATIC TELEPHONE MESSAGE MANAGEMENT APPARATUS

[75] Inventor: Kazumi Kawano, Fukuoka, Japan

[73] Assignee: Matsushita Electric Industrial Co., Ltd., Osaka, Japan

[21] Appl. No.: 214,559

[22] Filed: Mar. 18, 1994

[30] Foreign Application Priority Data

Mar. 23, 1993 [JP] Japan ................................. 5-062340

[51] Int. Cl.$^6$ ........................................................ H04M 1/65
[52] U.S. Cl. ................... 379/67; 379/88; 379/142; 379/73; 379/68
[58] Field of Search ............................ 379/67, 88, 89, 379/73, 84, 68, 142

[56] References Cited

U.S. PATENT DOCUMENTS

| | | | |
|---|---|---|---|
| 4,279,020 | 7/1981 | Christian et al. | 364/900 |
| 4,515,995 | 5/1985 | Bolick, Jr. et al. | 379/73 |
| 4,611,289 | 9/1986 | Coppola | 364/492 |
| 4,663,777 | 5/1987 | Szeto | 379/84 |
| 4,815,122 | 3/1989 | Shefler | 379/77 |
| 4,821,311 | 4/1989 | Hashimoto | 379/67 |
| 4,856,051 | 8/1989 | Ohtawara et al. | 379/67 |
| 4,959,852 | 9/1990 | Kern et al. | 379/70 |
| 5,075,894 | 12/1991 | Iwase et al. | 379/67 |
| 5,081,672 | 1/1992 | Mita et al. | 379/68 |
| 5,115,464 | 5/1992 | Waldman | 379/67 |
| 5,121,422 | 1/1992 | Kudo | 379/67 |
| 5,172,404 | 12/1992 | Hashimoto | 379/84 |
| 5,182,769 | 1/1993 | Yamaguchi et al. | 379/387 |
| 5,283,818 | 2/1994 | Klausner et al. | 379/96 |
| 5,289,528 | 2/1994 | Ueno et al. | 379/67 |
| 5,339,354 | 8/1994 | Becker et al. | 379/73 |

*Primary Examiner*—Jeffery Hofsass
*Assistant Examiner*—Scott Wolinsky
*Attorney, Agent, or Firm*—Stevens, Davis, Miller & Mosher

[57] ABSTRACT

In an automatic telephone message management apparatus connectable with two telephone lines, while a message is recorded on an analog recording cassette tape in response to a telephone call received via one of the two telephone lines in the automatic telephone message management operation mode of the apparatus, when another telephone call is made on the other telephone line, the apparatus operates also in the automatic telephone message management operation mode for the other telephone line, and a message received via the other telephone line is temporarily recorded in a digital IC memory. After completion of recording of the messages received via both of the two telephone lines, the message recorded in the digital IC memory is reproduced and subjected to D/A conversion, and then transferred to the analog recording cassette tape to be recorded thereon.

14 Claims, 9 Drawing Sheets

AUTOMATIC TELEPHONE MESSAGE MANAGEMENT APPARATUS

BACKGROUND OF THE INVENTION

1. Field of the Invention

The present invention relates to a telephone apparatus connectable with two telephone lines and having an automatic telephone message management function.

2. Description of the Related Art

An automatic telephone message management apparatus has recently been used widely because of its utility. Furthermore, an automatic telephone message management apparatus connectable with two telephone lines has rapidly been put into use in order to answer various needs.

A conventional telephone message management apparatus connectable with two telephone lines will be described hereunder with reference to the accompanying drawings.

Figure 6:
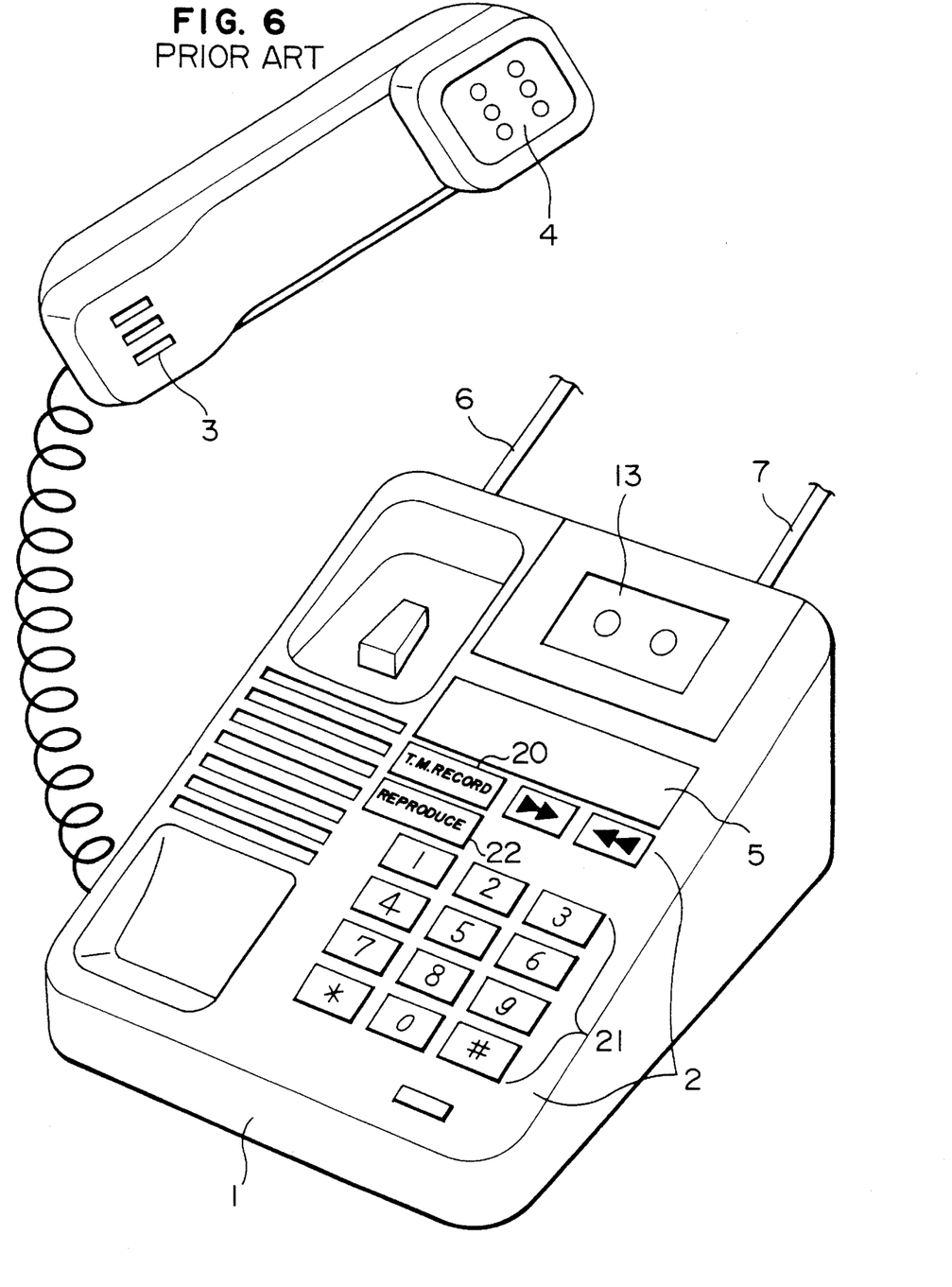
FIG. 6 is an external view of a conventional automatic telephone message management apparatus connectable with two telephone lines.
Figure 7:
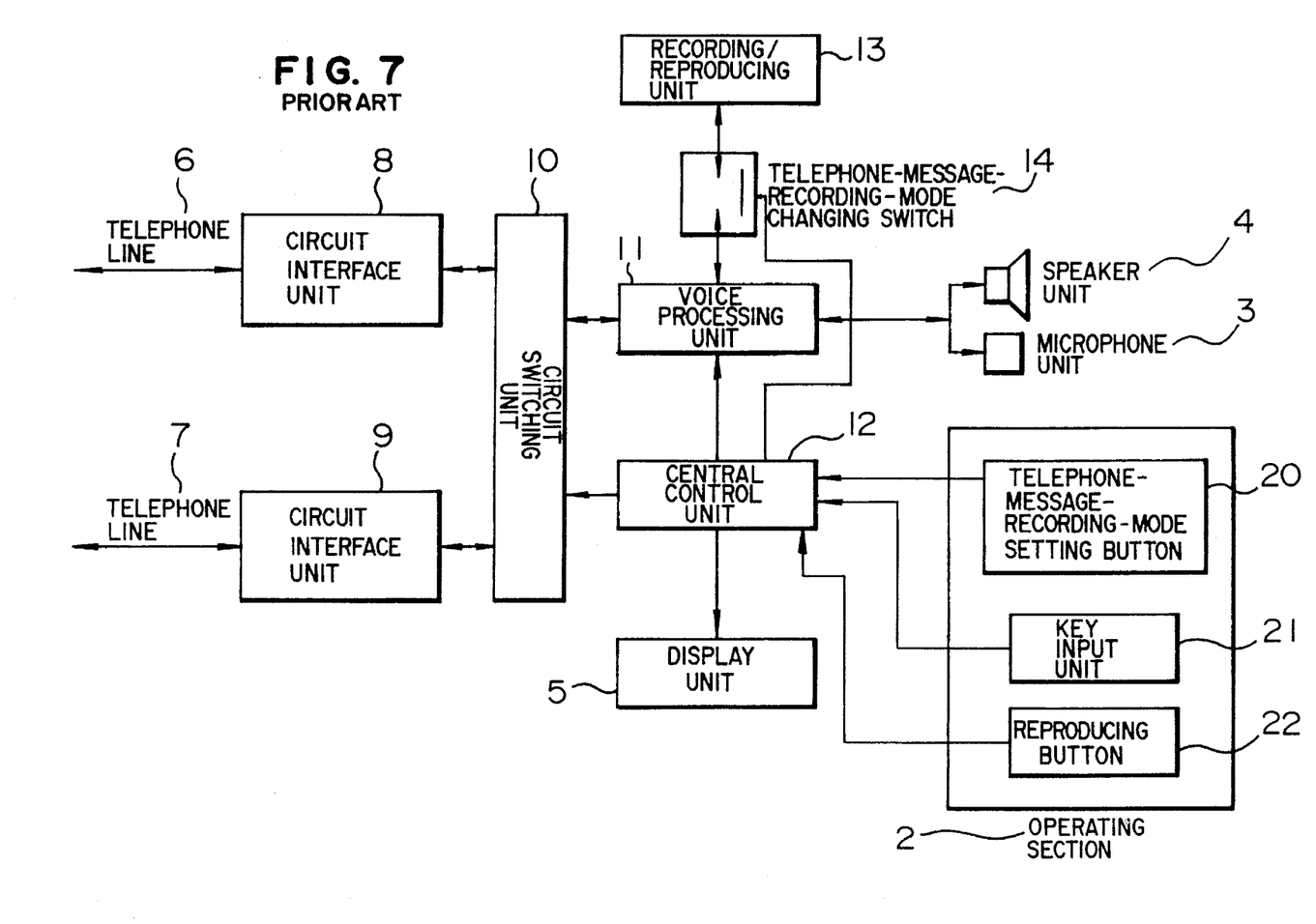
FIG. 7 is a block diagram showing a construction of the conventional automatic telephone message management apparatus connectable with two telephone lines shown in FIG. 6.

FIG. 6 is an external view of the automatic telephone message management apparatus connectable with two telephone lines. FIG. 7 is a block diagram showing a main body of the automatic telephone message management apparatus. In FIG. 6 and FIG. 7, reference numeral 1 denotes a main body of the automatic telephone message management apparatus, reference numeral 2 denotes an operating section operable by an operator to accept an input from outside to the apparatus, and it comprises a telephone-message-recording-mode setting button 20 for setting ON/OFF states of a telephone-message-recording-mode changing switch 14 (described later), a key input unit 21 composed of buttons necessary for making a telephone call, and a reproducing button 22 for reproducing a message of a telephone caller recorded on an analog signal recording cassette tape stored in a recording/reproducing unit 13 (explained later).

Further, reference numeral 3 denotes a microphone unit, reference numeral 4 denotes a speaker unit, and reference numeral 5 denotes a display unit composed of an LCD and the like for displaying various information. This display unit 5 is incorporated in the main body 1. Reference numerals 6 and 7 denote telephone lines, respectively, and reference numerals 8 and 9 denote circuit interface units for connecting and closing the telephone line 6 and the telephone line 7, respectively. Reference numeral 10 denotes a circuit switching unit for switching between the circuit interface unit 8 and the circuit interface unit 9. Reference 11 denotes a voice processing unit for processing a voice signal, and reference numeral 12 denotes a central control unit for controlling the operation of the whole apparatus. Reference numeral 13 denotes a recording/reproducing unit capable of holding an analog signal recording cassette tape and recording/ reproducing a message of a telephone caller. Reference numeral 14 denotes a telephone-message-recording-mode changing switch for switching the connection between the voice processing unit 11 and the recording/reproducing unit 13 to be switched on or off.

With respect to the conventional automatic telephone message managing apparatus connectable with two telephone lines, as constructed by the above-described component units, the relation between these component units and the operations thereof will be explained.

Firstly, in an initial state, the telephone-message-recording-mode changing switch 14 is in the OFF state. In this condition, when a telephone call is made on the telephone line 6, the central control unit 12 controls the circuit switching unit 10 to connect and close the circuit interface unit 8 and the voice processing unit 11. At the same time, a call is made to a user, and the display unit 5 displays that a telephone call has been made. The user of the main body of this automatic telephone message management apparatus can have a usual telephone conversation by using the microphone unit 3 and the speaker unit 4. Here, a base band signal inputted from the microphone unit 3 is processed in the voice processing unit 11 and sent out via the circuit switching unit 10 and the circuit interface unit 8 to the telephone line 6. Conversely, a voice signal inputted from the telephone line 6 is produced as a voice from the speaker unit 4 via the circuit interface unit 8, the circuit switching unit 10 and the voice processing unit 11.

In this state, when a telephone call is made from the other telephone line 7, the central control unit 12 perceives this telephone call and performs the same signal processing as the above-described case where the telephone call was made on the telephone line 6. Then, the central control unit 12 makes the display unit 5 display information indicative of reception of the telephone call. As a consequence, the user of the main body 1 of the automatic telephone message management apparatus can recognize that a telephone call is made on the other telephone line 7 and can have a usual telephone communication with a telephone caller on the telephone line 7 while holding or disconnecting the telephone line 6.

Figure 8:
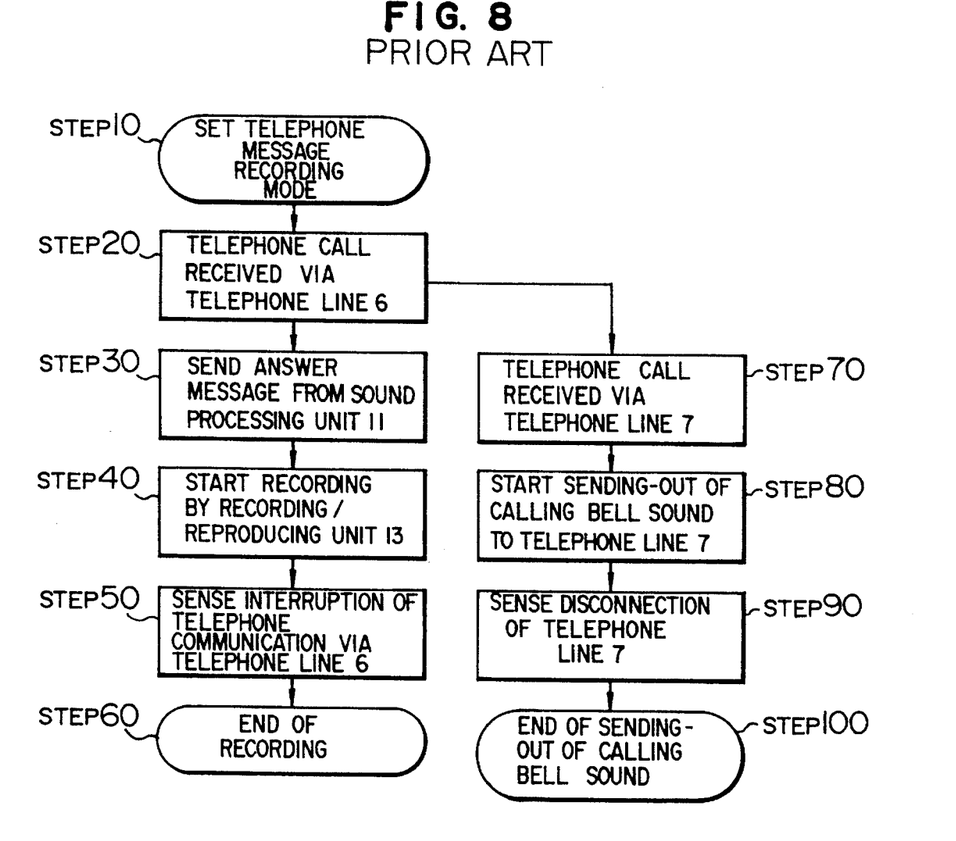
FIG. 8 is a flow chart illustrating an operation of the conventional automatic telephone message management apparatus connectable with two telephone lines shown in FIG. 6.

Referring to a flow chart of FIG. 8, a description will be made of such a case where the user of the main body 1 of the automatic telephone message management apparatus is absent, by being out, for example, and cannot respond to a telephone call received either via the telephone line 6 or via the telephone line 7. First, if the user of the main body 1 of the automatic telephone message management apparatus depresses the telephone-message-recording-mode setting button 20 in the operating section 2, the central control unit 12 actuates the telephone-message-recording-mode changing switch 14. As a result, the telephone-message-recording-mode changing switch 14 is brought into an ON state so that the voice processing unit 11 and the recording/reproducing unit 13 are connected with each other (step 10).

In this state, when a telephone call is received via the telephone line 6 (step 20), the central control unit 12 instructs the voice processing unit 11 to reproduce an answer message, which has been recorded beforehand on a voice storage unit composed of IC and the like and disposed in the recording/reproducing unit 13 by the user of the main body 1 of the automatic telephone message management apparatus, and also to send out the reproduced answer message on the telephone line 6 (step 30).

The recording/reproducing unit 13 stores an analog recording cassette tape therein and starts a recording operation, after completion of sending out the above-described answer message, to record thereon a voice message of a telephone caller on the telephone line 6 via the circuit interface unit 8, the circuit switching unit 10, the voice processing unit 11 and the telephone-message-recording-mode changing switch 14 (step 40). Thereafter, when the central control unit 12 senses interruption of the telephone communication via the telephone line 6 (step 50), the central control unit 12 releases the connection between the circuit interface unit 8 and the voice processing unit 11, and the recording/reproducing unit 13 ends the recording operation (step 60).

Then, when the user of the main body 1 of the automatic telephone message management apparatus returns to his or her home and listens to the voice message of the telephone caller which has been recorded on the analog signal recording cassette tape stored in the recording/reproducing unit 13, the user depresses the reproducing button 22 in the operating section 2. Then, the central control unit 12 makes the voice processing unit 11 and the recording/reproducing unit 13 start their operations cooperatively so that the voice message of the telephone caller, which has been recorded on the analog signal recording cassette tape stored in the recording/reproducing unit 13, is produced via the voice processing unit 11 and the speaker unit 4.

When the automatic telephone message recording mode of the main body 1 of the automatic telephone message management apparatus is to be released, the user of the main body 1 depresses again the telephone-message-recording-mode setting button 20. Then, the telephone-message-recording-mode changing switch 14 is brought into the OFF state, and therefore the voice processing unit 11 is disconnected from the recording/ reproducing unit 13.

However, in the above-described conventional automatic telephone message management apparatus connectable with two telephone lines, there have existed the following problems in an operation of the apparatus at the time when the user of the main body 1 of the automatic telephone message management apparatus is absent, by being out, for example, and cannot respond to telephone calls on the telephone line 6 and the telephone line 7.

That is, while the recording/reproducing unit 13 is operating in response to a telephone call on the telephone line 6 as described with respect to the conventional example, if another telephone call is received via the other telephone line 7 (step 70), since the main body 1 of the automatic telephone message management apparatus is operating in response to the telephone call via the telephone line 6, the main body 1 is not allowed to respond to another telephone call via the telephone line 7. As a result, even when the central control unit 12 perceives reception of the telephone call via the telephone line 7, the central control unit 12 does nothing but send out a calling bell sound to the telephone line 7 (step 80), so that the telephone caller on the telephone line 7 is obliged to disconnect the telephone line 7 without leaving his or her voice message (step 90 and step 100).

Figure 9:
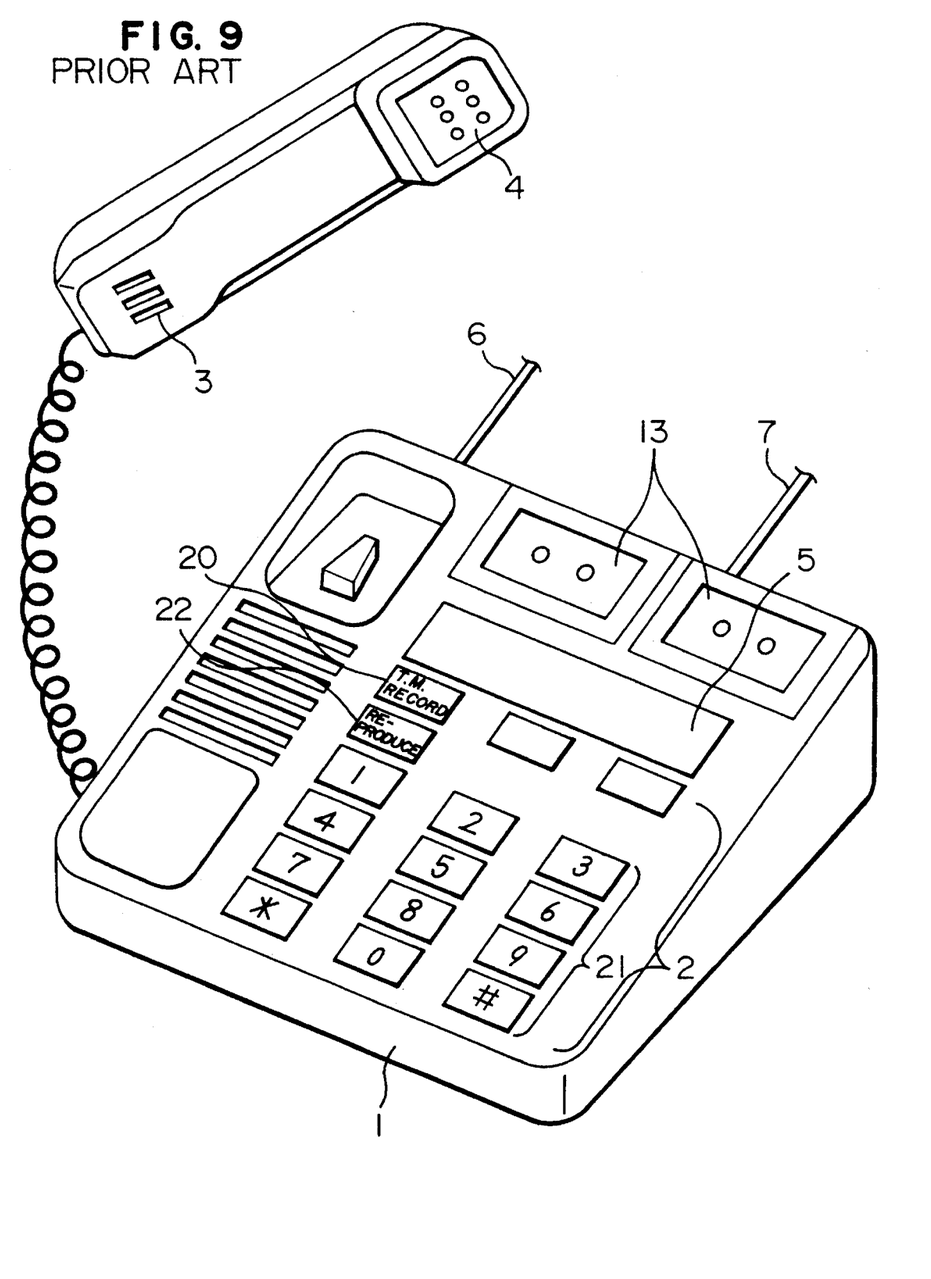
FIG. 9 is an external view of an exemplary conventional automatic telephone message management apparatus connectable with two telephone lines.

As one measure for solving this problem, it may be conceivable that, as illustrated in FIG. 9 showing an external view of the main body 1 of the automatic telephone message management apparatus, two recording/reproducing units 13 may be provided each of which can mount thereon one analog recording cassette tape for each of the telephone lines.

However, with the above-described structure, the overall size of the main body 1 of the automatic telephone message management apparatus is increased, and also the manufacturing cost thereof is increased, which reduces consumer's purchasing motivation.

SUMMARY OF THE INVENTION

The present invention intends to solve the above-described problems and has an object to provide an automatic telephone message management apparatus connectable with two telephone lines and capable of storing voice messages of two telephone callers on two respective telephone lines, even when telephone calls are received at the same time from the two telephone callers via the two telephone lines, respectively. Besides, the size of the main body of the automatic telephone message management apparatus is substantially the same as that of a conventional automatic telephone message management apparatus.

To achieve the above-described object, the automatic telephone message management apparatus connectable with two telephone lines of the present invention is constructed to comprise a digital recording/reproducing unit and a digital voice processing unit for performing a voice processing operation required to perform a digital recording operation so that a voice signal recorded on the digital recording/reproducing unit may be transferred to an analog recording type cassette tape stored in the recording/reproducing unit.

With the above-described construction of the apparatus of the present invention, while a voice message of a telephone caller on one telephone line is recorded on the analog signal recording cassette tape in response to the telephone call via the one telephone line, when another telephone call is received via the other telephone line, the circuit interface unit of the other telephone line can be connected with the digital voice processing unit so that a voice message of a telephone caller on the other telephone line may be stored in the digital recording/reproducing unit.

As a result, even when two telephone calls are received at the same time via the two telephone lines, respectively, the automatic telephone message managing function can be performed satisfactorily.

DESCRIPTION OF THE PREFERRED EMBODIMENT

Referring to the accompanying drawings, an automatic telephone message management apparatus connectable with two telephone lines of an embodiment of the present invention will be described.

Figure 1:
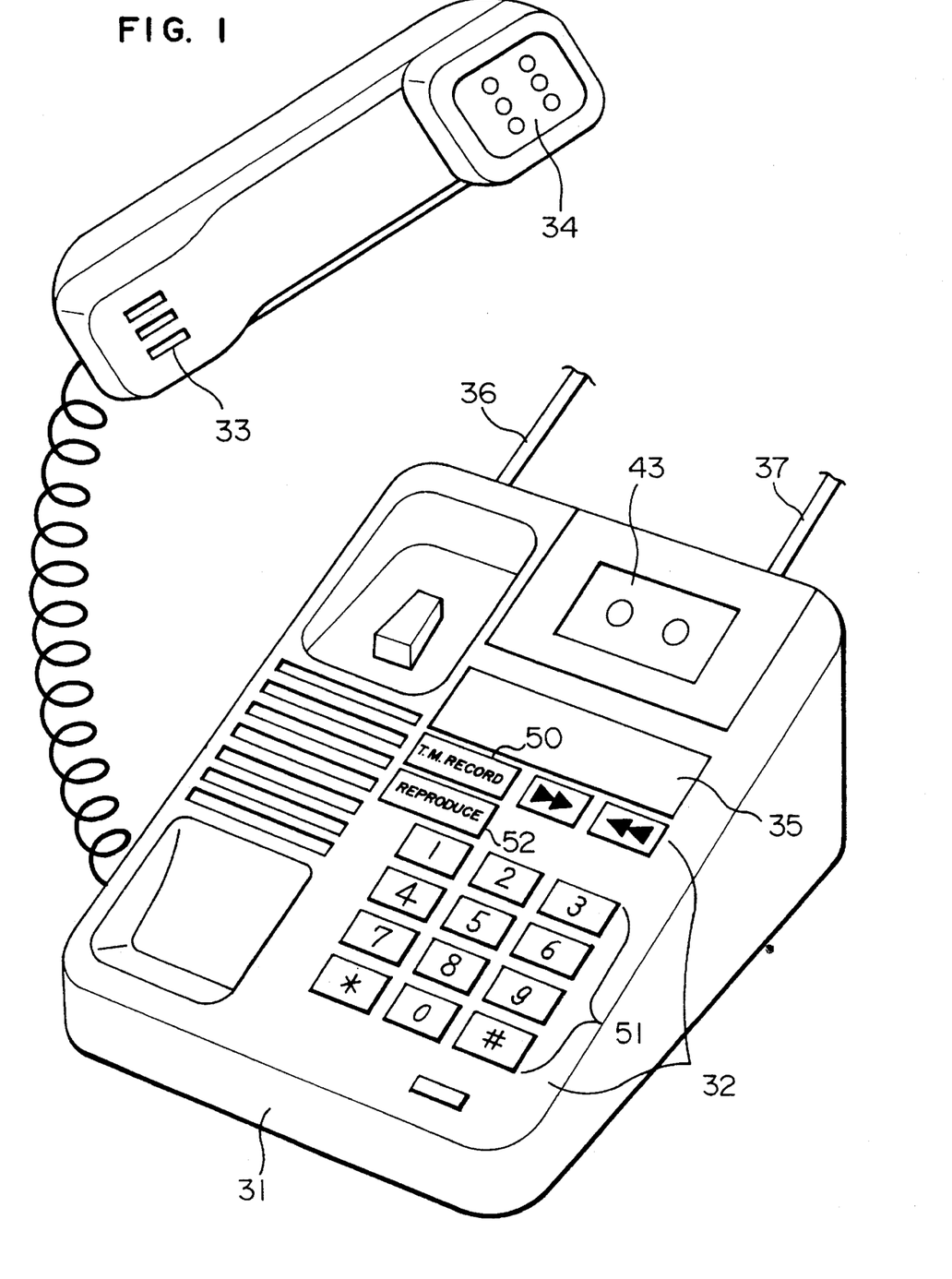
FIG. 1 is an external view of an automatic telephone message management apparatus connectable with two telephone lines of an embodiment of the present invention.
Figure 2:
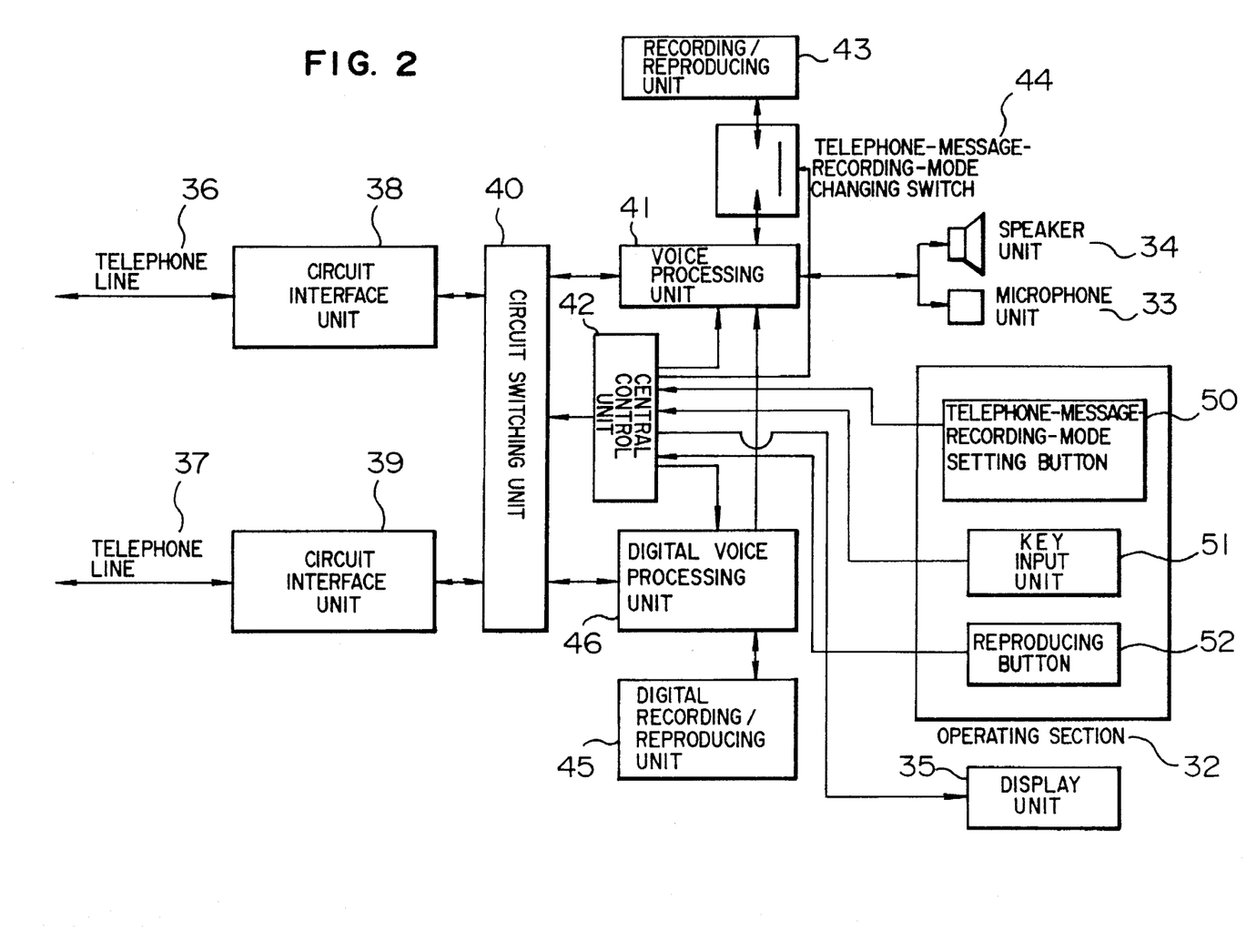
FIG. 2 is a block diagram showing a construction of the automatic telephone message management apparatus connectable with two telephone lines shown in FIG. 1.

FIG. 1 is an external view of an automatic telephone message management apparatus connectable with two telephone lines according to an embodiment of the present invention. FIG. 2 is a block diagram showing a main body of this automatic telephone message management apparatus. In the drawings, reference numeral 31 denotes a main body of the automatic telephone message management apparatus, reference numeral 32 denotes an operating section operable to accept an input from outside to the apparatus, and reference numeral 50 denotes a telephone-message-recording-mode setting button for setting ON/OFF states of a telephone-message-recording mode changing switch 44 (described later). Reference numeral 51 denotes a key input unit composed of buttons necessary for making a telephone call, and reference numeral 52 denotes a reproducing button for reproducing a message of a telephone caller recorded on an analog signal recording cassette tape mounted on a recording/reproducing unit 43 (explained later).

Further, reference numeral 33 denotes a microphone unit, reference-numeral 34 denotes a speaker unit, and reference numeral 35 denotes a display unit composed of an LCD and the like for displaying various information. This display unit 35 is incorporated in the main body 31, and it has substantially the same size as that of a conventional main body. Reference numerals 36 and 37 denote telephone lines, respectively, reference numerals 38 and 39 denote circuit interface units for connecting and closing the telephone line 36 and the telephone line 37, respectively. Reference numeral 40 denotes a circuit switching unit for switching between the circuit interface unit 38 and the circuit interface unit 39. Reference 41 denotes a voice processing unit for processing a voice signal, and reference numeral 42 denotes a central control unit for controlling the operation of the whole apparatus. Reference numeral 43 denotes a recording/reproducing unit capable of mounting thereon an analog signal recording cassette tape and recording/ reproducing a message of a telephone caller. Reference numeral 44 denotes a telephone-message-recording-mode changing switch for switching the connection between the voice processing unit 41 and the recording/reproducing unit 43 to be switched on or off. The above-described construction is entirely identical to that of the conventional automatic telephone message management apparatus.

The present embodiment is featured in that the construction described herein has been newly added to the conventional construction. That is, there are newly provided a digital recording/reproducing unit 45 having a digital recording IC for digitally recording/reproducing a message of a telephone caller and a digital voice processing unit 46 for digitizing a voice signal from the circuit switching unit 40 and for making analog representation of a voice signal from the digital recording/reproducing unit 45.

An operation of the automatic telephone message management apparatus having the above-mentioned construction will be explained hereunder.

First, a description will be made of steps taken when a telephone call is received via the telephone line 37 while a user is making telephone communication via the other telephone line 36. In the initial state, the telephone-message-recording-mode changing switch 44 is in the OFF state. In this condition, when a telephone call is received via the telephone line 36, the central control unit 42 controls the circuit switching unit 40 to connect and close the circuit interface unit 38 and the voice processing unit 41. As a result, the user will make a usual telephone communication with a telephone caller on the telephone line 36 via the line interface unit 38 and the voice processing unit 41 by using the microphone unit 33 and the speaker unit 34.

If another telephone call is received via the other telephone line 37 while the user of the main body 31 of the automatic telephone message management apparatus is making telephone communication on the telephone line 36, the central control unit 42 perceives this telephone call and displays a message indicative of this telephone call on the display unit 35. As a consequence, the user of the main body 31 of the automatic telephone message management apparatus can recognize that the telephone call is received via the other telephone line 37 and can have a usual telephone communication on the other telephone line 37 either by holding or by disconnecting the telephone line 36.

Furthermore, while the user of the main body 31 is making a telephone communication with a telephone caller via the telephone line 36, when another telephone call is made on the other telephone line 37, the central control unit 42 perceives this telephone call and displays the message of this telephone call on the display unit 35. If the user confirms this message and depresses the telephone-message-recording-mode setting button 50, the user is allowed to make an automatic telephone message management response to the telephone line 37. Conversely, the same is the case when a telephone call is made on the telephone line 36, while a telephone communication is made via the telephone line 37.

Figure 3:
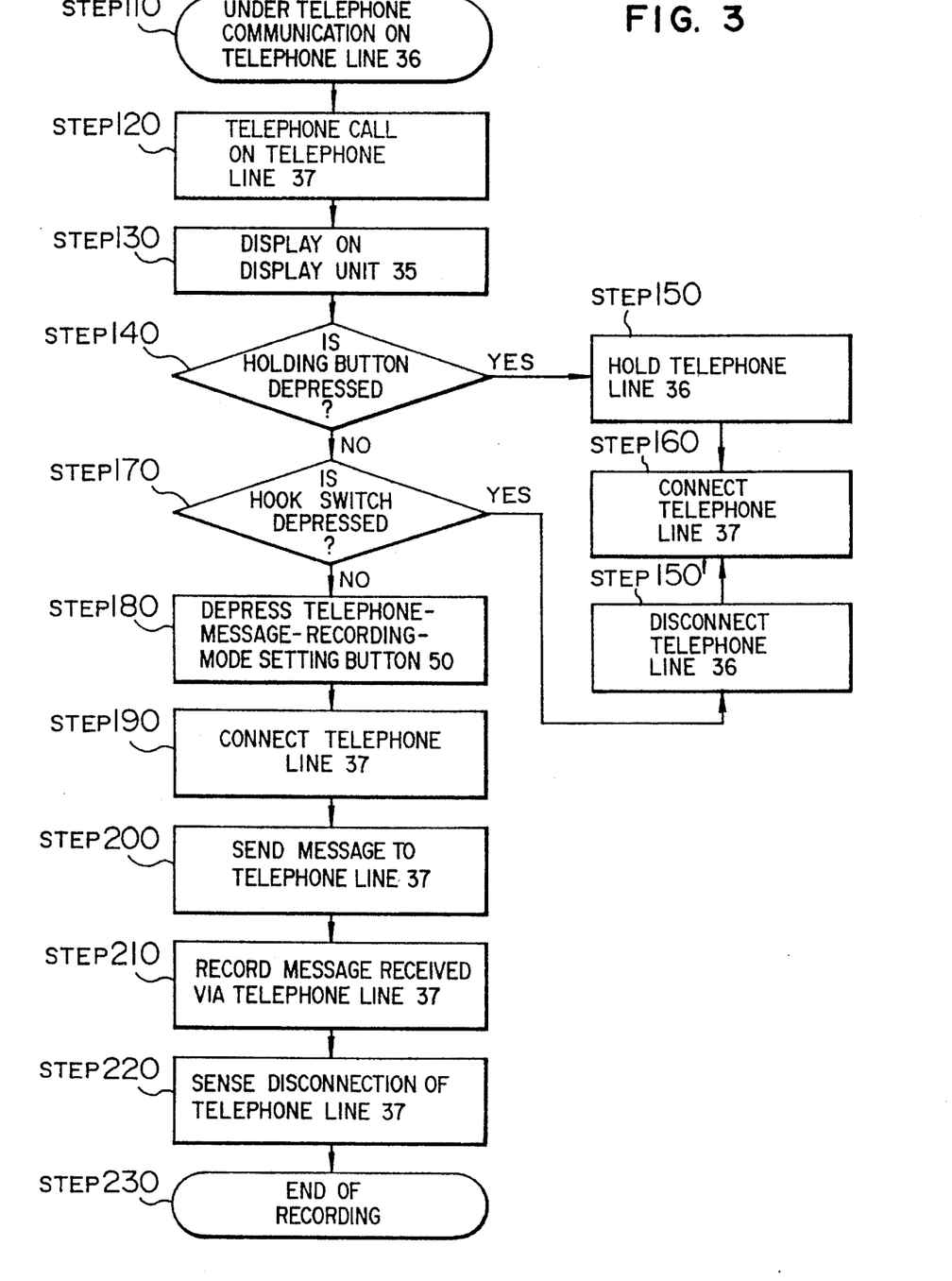
FIG. 3 is a flow chart illustrating an operation of the automatic telephone message management apparatus connectable with two telephone lines shown in FIG. 1.

The above-described operation will be explained with reference to FIG. 3. While the user is making a telephone communication via the telephone line 36 (step 110), if another telephone call is made on the telephone line 37 (step 120), the display unit 35 indicates that a telephone call has been received via the telephone line 37 (step 130). The user confirms the indication on the display unit 35 and selects the following steps.

That is, when the user depresses a holding button provided in the operating section 32 (step 140), the central control unit 42 controls the circuit switching unit 40 to hold the telephone line 36 (step 150), and connects the telephone line 37 (step 160), so that the user can make a telephone communication with a telephone caller on the telephone line 37, while keeping another telephone caller on the telephone line 36 in the waiting state.

When the holding button is not depressed, but instead the hook switch is depressed (step 170), the central control unit 42 controls the circuit interface unit 38 to disconnect the telephone line 36 and controls the circuit interface unit 39 to connect the telephone line 37 (steps 150' and 160) so that the user can make a usual telephone communication with a telephone caller on the telephone line 37.

When the telephone-message-recording-mode setting button 50 is depressed (step 180), the telephone line 37 is set to the telephone message recording mode while maintaining the telephone communication with the telephone caller via the telephone line 36, and the central control unit 42 controls the circuit interface unit 39 to connect the telephone line 37 (step 190).

Further, the central control unit 42 controls the telephone-message-recording-mode changing switch 44 to be put into an ON state so that the voice processing unit 41 and the recording/reproducing unit 43 are connected with each other. Then, the central control unit 42 controls both of the digital voice processing unit 46 and the digital recording/reproducing unit 45 to be actuated so that an answer message recorded beforehand on the digital recording/reproducing unit 45 is sent out on the telephone line 37 (step 200).

When the telephone caller on the telephone line 37 listens to the above-mentioned answer message and transmits his or her message, his or her message is processed in the voice processing unit 41 and then recorded on the cassette tape mounted on the analog recording/ reproducing unit 43 (step 210). When the circuit interface unit 39 senses the disconnection of the telephone line 37 (step 220), the central control unit 42 controls to disconnect the voice processing unit 41 and the recording/reproducing unit 43 from the telephone line 37, thereby ending the recording operation thereof (step 230).

The description of the above-mentioned embodiment of the present invention has been made of a case where the user depresses the telephone-message-recording-mode setting button 50 while the user is making a telephone communication with a telephone caller on the telephone line 36. In an initial state where no telephone call is received via both of the telephone lines 36 and 37, if the user has depressed the telephone-message-recording-mode setting button 50 beforehand, even when a telephone call is received via the telephone line 37 while the user is making a telephone communication with a telephone caller on the telephone line 36, the central control unit 42 can respond to the telephone call on the telephone line 37. Thus, the central control unit 42 controls the telephone-message-recording-mode changing switch 44 to be put into an ON state so that the voice processing unit 41 is connected with the recording/reproducing unit 43. Then, the central control unit 42 controls both of the digital voice processing unit 46 and the digital recording/reproducing unit 45 to be actuated so that an answer message recorded beforehand on the digital recording/reproducing unit 45 is sent out on the telephone line 37.

Then, when the telephone caller on the telephone line 37 listens to the above-mentioned answer message and transmits his message, his message is processed in the voice processing unit 41 and then recorded on the cassette tape mounted on the analog recording/ reproducing unit 43. When the circuit interface unit 39 senses the disconnection of the telephone line 37, the central control unit 42 controls to disconnect the voice processing unit 41 and the recording/ reproducing unit 43 from the telephone line 37, thereby terminating the message recording operation.

Next, when telephone calls are made via both of the telephone line 36 and the telephone line 37 at the same time, if the user off-hooks the handset (thereby making the handset switched on), it is possible to set the system so that a telephone call sent on either one of the telephone lines may be responded to with priority. For instance, if it has been set so that a telephone call on the telephone line 36 is to be responded to with priority, when the user off-hooks the handset, then the telephone line 36 is connected and closed and the display unit 35 indicates that a telephone call has been received via the telephone line 37. Further, if the user depresses the telephone-message-recording-mode setting button 50 while making a telephone communication on the telephone line 36, it is possible to make an automatic telephone message management response via the telephone line 37.

Figure 4:
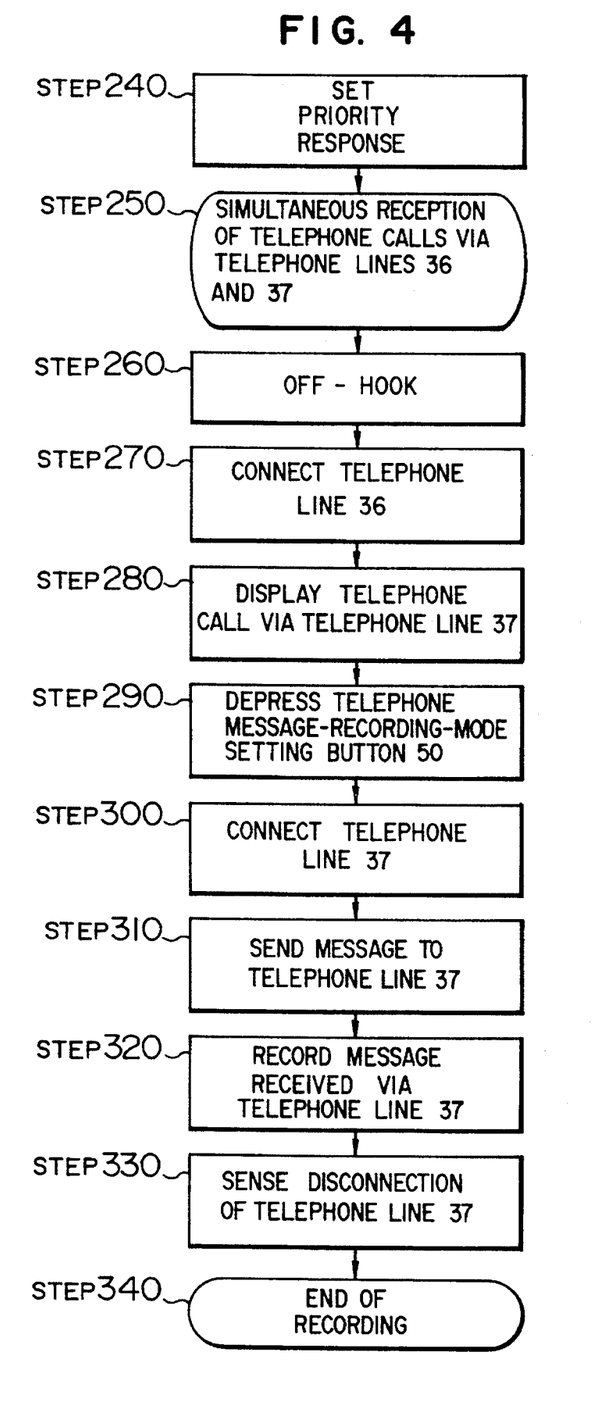
FIG. 4 is a flow chart illustrating another operation of the automatic telephone message management apparatus connectable with two telephone lines shown in FIG. 1.

The above-described responding operation with priority will be described with reference to FIG. 4. FIG. 4 is a flow chart explaining that a responding operation with priority is performed via the telephone line 36 when telephone calls are made at the same time on the telephone line 36 and the telephone line 37. First, the key input unit 51 in the operating section 32 is manipulated to set a priority response to the telephone line 36 (step 240). When telephone calls are made at the same time on the telephone line 36 and the telephone line 37 (step 250), if the user off-hooks the handset (step 260), then the telephone line 36 is connected and closed (step 270). Since a telephone call received via the telephone line 37 is indicated on the display unit 35 while the user is making a telephone communication with a telephone caller on the telephone line 36 (step 280), the user confirms the indication on the display unit 35 and then depresses the telephone-message-recording-mode setting button 50 (step 290). As a result, the central control unit 42 operates to actuate the circuit switching unit 40 and the circuit interface unit 39, thereby connecting and closing the telephone line 37 (step 300). At the same time, the central control unit 42 operates to actuate the digital voice processing unit 46 and the digital recording/ reproducing unit 45 so that an answer message recorded in the digital recording/reproducing unit 45 beforehand is sent out to the telephone line 37 (step 310).

When the telephone caller on the telephone line 37 listens to the above-described answer message and returns his message, his message is transmitted via the telephone line 37 and the circuit interface unit 39 and voice-processed in the voice processing unit 41, and the processed message is recorded in the recording/ reproducing unit 43 (step 320). When the circuit interface unit 39 senses that the telephone line 37 has been disconnected (step 330), the central control unit 42 operates to disconnect the voice processing unit 41 and the recording/reproducing unit 43 from the telephone line 37, thereby terminating the recording operation (step 340).

Figure 5:
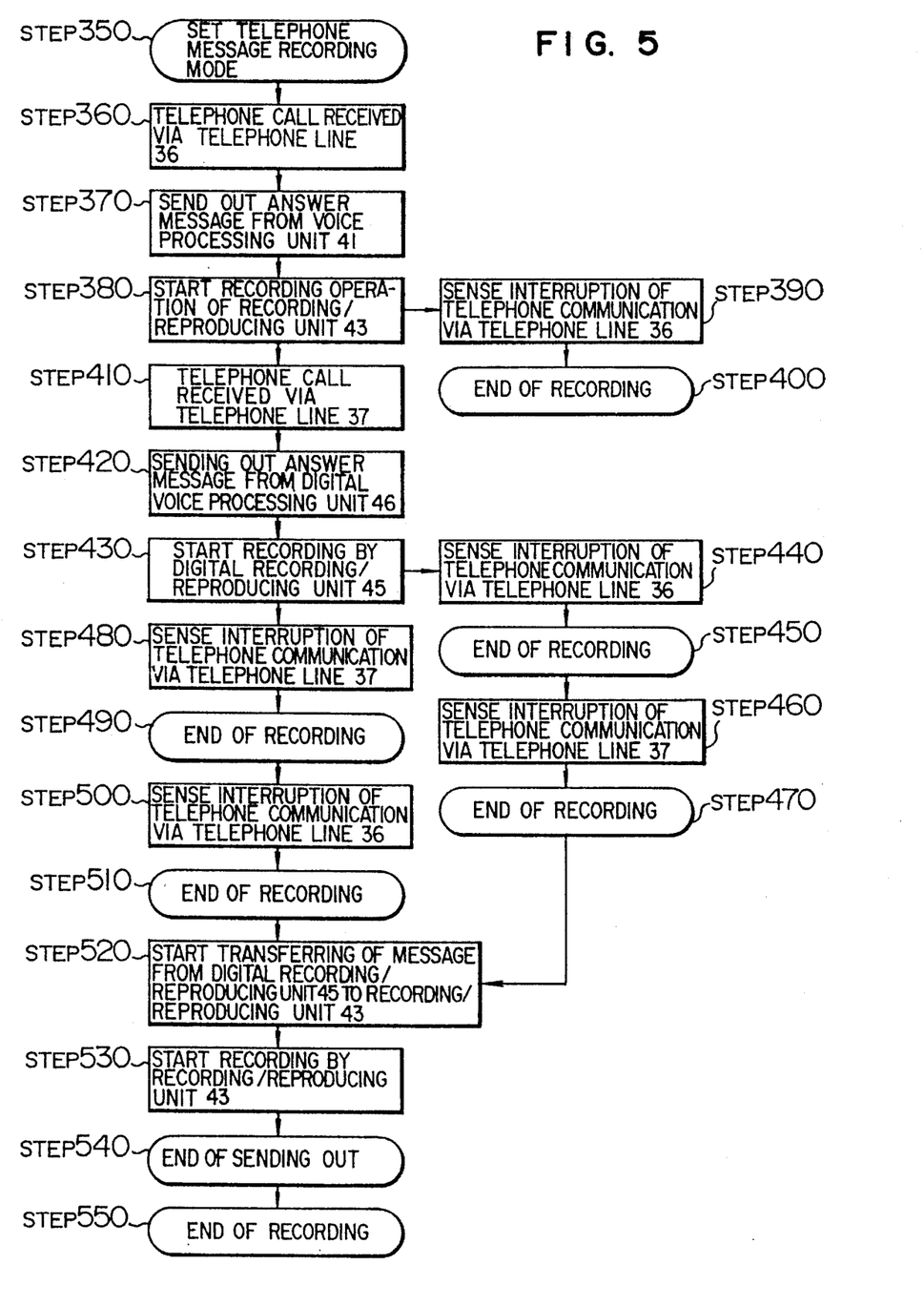
FIG. 5 is a flow chart illustrating a further operation of the automatic telephone message management apparatus connectable with two telephone lines shown in FIG. 1.

Referring now to a flow chart shown in FIG. 5, a description will be made of a case where a user of the main body 31 of the automatic telephone message management apparatus is absent, by being out, for example, and cannot respond to telephone calls received via the telephone line 36 and the telephone line 37. First, when the user of the main body 31 of the automatic telephone message management apparatus depresses the telephone-message-recording-mode setting button 50 provided in the operating section 32, the central control unit 42 controls the telephone-message-recording-mode changing switch 44 to be put into an ON state so that the voice processing unit 41 is connected with the recording/reproducing unit 43 (step 350). In this state, when a telephone call is made on the telephone line 36 (step 360), the central control unit 42 instructs the voice processing unit 41 to send out an answer message, which has been recorded in the digital recording/reproducing unit 45 beforehand by the user of the main body 31 of the automatic telephone message management apparatus, to the telephone line 36 (step 370). After the answer message has been sent out, the recording/reproducing unit 43 starts a recording operation to record a voice message on the analog recording cassette tape (step 380). This voice message is sent from a telephone caller on the telephone line 36 and via the circuit interface unit 38, the voice processing unit 41 and the telephone-message-recording-mode changing switch 44. Thereafter, when the central control unit 42 perceives that the telephone communication made on the telephone line 36 has been interrupted (step 390), the central control unit 42 operates to release the connection between the circuit interface unit 38 and the voice processing unit 41, whereby the recording/reproducing unit 43 completes the recording operation (step 400). The above-described operation is completely the same as that of a conventional automatic telephone message management apparatus.

Next, a description will be made of the state of the step 380, namely, a case where a telephone call is received via the telephone line 37, while a message of a telephone caller on the telephone line 36 is being recorded. When the central control unit 42 senses that a telephone call is received via the telephone line 37, the central control unit 42 controls both of the circuit interface unit 39 and the digital voice processing unit 46 to be connected with each other (step 410). Then, the central control unit 42 instructs the digital voice processing unit 46 to reproduce an answer message which has been recorded in the digital recording/reproducing unit 45 beforehand by the user of the main body 31 of the automatic telephone message management apparatus (step 420). After sending-out the answer message, the digital voice processing unit 46 operates to digitize an analog voice signal message of a telephone caller transmitted on the telephone line 37 and via the circuit interface unit 39 and the circuit switching unit 40. Thereafter, the digital recording/reproducing unit 45 records the digitized voice signal message thereon (step 430).

In this state, when the central control unit 42 senses that the telephone communication of the telephone caller on the telephone line 36 has been interrupted (step 440), the circuit switching unit 40 releases the connection between the circuit interface unit 38 and the voice processing unit 41, and the recording/reproducing unit 43 terminates the recording operation (step 450). Then, after the lapse of a short time, when the central control unit 42 senses that the telephone communication of the telephone caller on the telephone line 37 has been interrupted (step 460), the circuit switching unit 40 releases the connection between the circuit interface unit 39 and the digital voice processing unit 46, and the digital recording/ reproducing unit 45 completes the recording operation (step 470).

It should be noted that the processing operations as defined by the step 440 to the step 470 may be performed in the opposite relationship between the telephone lines 36 and 37. In other words, when the central control unit 42 senses that the telephone communication of the telephone caller on the telephone line 37 has been interrupted in the state of the step 430 (step 480), the circuit switching unit 40 releases the connection between the circuit interface unit 39 and the digital voice processing unit 46, and the digital recording/ reproducing unit 45 completes the recording operation (step 490). Then, after the lapse of a short time, when the central control unit 42 senses that the telephone communication of the telephone caller on the telephone line 36 has been interrupted (step 500), the circuit switching unit 40 releases the connection between the circuit interface unit 38 and the voice processing unit 41, and the recording/reproducing unit 43 completes the recording operation (step 510).

When the central control unit 42 perceives that the telephone communications via both of the telephone line 36 and the telephone line 37 have been interrupted, the central control unit 42 controls the digital voice processing unit 46 to reproduce a digital voice signal recorded in the digital recording/reproducing unit 45. The reproduced digital voice signal is converted to an analog voice signal in the digital voice processing unit 46, and then the converted analog voice signal is transmitted to the recording/reproducing unit 43 (step 520). The central control unit 42 turns again the recording/reproducing unit 43 into the recording state so that the converted analog voice signal is recorded on the analog recording cassette tape mounted on the recording/reproducing unit 43 (step 530). When the sending-out of the voice signal from the digital recording/reproducing unit 45 has ended (step 540), the central control unit 42 operates to terminate the recording operation of the recording/reproducing unit 43 (step 550), and the central control unit 42 operates to put the main body 31 of the automatic telephone message management apparatus into the initial condition (step 340).

In this state, when another telephone call is made again on the telephone line 36, the processing operations defined by the step 350 to the step 380 are repeated, and the recording operation is performed again on the cassette tape mounted on the recording/reproducing unit 43 starting from the recording operation ending time point at the step 550. Then, when a telephone call is received via the telephone line 37 in this state, the operations as defined by the step 410 to the step 470 or by the step 410 to the step 510 are repeated. At this time, the recording operation performed in the step 430 is performed in such a manner that a digital voice signal recorded before is updated. Thereafter, when the central control unit 42 perceives that telephone communications via both of the telephone line 36 and the telephone line 37 have been interrupted, the processing operations defined by the step 520 to the step 550 are repeated.

Under the circumstances, in a case where the user of the main body 31 of the automatic telephone message management apparatus listens to a voice message recorded on the analog recording cassette tape mounted on the recording/reproducing unit 43 after he or she has returned to his or her home, if the reproducing button 52 in the operating section 32 is depressed, the central control unit 42 operates to actuate the voice processing unit 41 and the recording/reproducing unit 43, respectively, so that a voice message recorded on the analog recording cassette tape mounted on the recording/reproducing unit 43 is outputted via the voice processing unit 41 and the speaker unit 34.

Since messages of telephone callers on both of the telephone line 36 and the telephone line 37 have been recorded on the analog recording cassette tape, it is possible for the user of the main body 31 of the automatic telephone message management apparatus to get access to the telephone callers' messages via the voice processing unit 41 and the speaker unit 34 by performing the above-described operations.

When the user of the main body 31 of the automatic telephone message management apparatus depresses again the telephone-message-recording-mode setting button 50, the telephone-message-recording mode changing switch 44 is turned off.

As is apparent from the foregoing descriptions of the embodiments of the present invention, in the automatic telephone message management apparatus connectable with two telephone lines of the present invention, even if telephone calls are received via both of the two telephone lines, messages of both of the telephone callers on the two telephone lines, respectively, can be recorded, so that the user of the main body of the automatic telephone message management apparatus can get access to the messages without omission.

Furthermore, since voice messages recorded digitally are transferred to the analog recording cassette tape every time the digital voice messages are reproduced, the memory capacity of the digital recording/reproducing unit may be made small. As a consequence, the cost of the digital recording/reproducing unit can also be reduced. Further, the size of the main body of the automatic telephone message management apparatus may be substantially the same as that of a conventional apparatus. As a result, it is possible to provide a very usable automatic telephone message management apparatus.

What is claimed is:

1. An automatic telephone message management apparatus comprising:

(a) first recording/reproducing means for performing analog recording and reproducing of a voice signal;

(b) second recording/reproducing means for digitally recording a voice signal and for reproducing the digitally recorded voice signal;

(c) a user interface to enable communication between a user and a caller over a telephone line;

(d) a plurality of circuit interface means including:

a first circuit interface means for connection to a first telephone line and for being placed selectively into a closed state or an open state, said first circuit interface means in said closed state and said open state respectively providing a connection and a disconnection between (i) said first telephone line and (ii) any one of said user interface, said first recording/reproducing means and said second recording/reproducing means, and a second circuit interface means for connection to a second telephone line and for being placed selectively into a closed state or an open state, said second circuit interface means in said closed state and said open state respectively providing a connection and a disconnection between (i) said second telephone line and (ii) any one of said user interface, said first recording/reproducing means and said second recording/reproducing means; and (e) control means for (1) controlling said first circuit interface means to occupy said closed state in response to a telephone call received via said first circuit interface means, (2) controlling digital recording of a voice signal on said second recording/reproducing means when said second circuit interface means is placed in said closed state in response to a telephone call received via said second circuit interface means while said first circuit interface means is in said closed state and (3) converting said voice signal digitally recorded on said second recording/reproducing means into an analog signal and providing said analog signal to said first recording/reproducing means.

2. An automatic telephone message management apparatus according to claim 1, further comprising:

hold instructing means for generating an output signal which instructs holding of a telephone line connected to any one of said circuit interface means; and wherein:

said control means controls, when said hold instructing means generates said output signal and either one of said first and second circuit interface means is in said closed state, (i) holding of a connection of the one of said first and second telephone lines that is connected to said either one of said first and second circuit interface means in response to said output signal of said hold instructing means and (ii) placing of the other one of said first and second circuit interface means into said closed state during said holding of said connection of said one of said first and second telephone lines that is connected to said either one of said first and second circuit interface means.

3. An automatic telephone message management apparatus according to claim 1, further comprising:

hooking means formed of a single hook switch for generating an output signal when a hook switch is depressed; and wherein said control means controls, when said hooking means generates said output signal and either one of said first and second circuit interface means is in said closed state, (i) removal of said either one of said first and second circuit interface means from said closed state and placing of said either one of said first and second circuit interface means into said open state in response to said output signal of said hooking means, and (ii) placing the other one of said first and second circuit interface means into said closed state in response to said placing of said either one of said first and second circuit interface means into said open state.

4. An automatic telephone message management apparatus as claimed in claim 1, further comprising:

display means for displaying an indication of reception of a telephone call via one of said first and second telephone lines under control of said control means.

5. An automatic telephone message management apparatus comprising:

(a) first recording/reproducing means for performing analog recording and reproducing of a voice signal;

(b) second recording/reproducing means for digitally recording a voice signal and for reproducing the digitally recorded voice signal;

(c) a user interface to enable communication between a user and a caller over a telephone line;

(d) a plurality of circuit interface means including:

a first circuit interface means for connection to a first telephone line and for being placed selectively into a closed state or an open state, said first circuit interface means in said closed state and said open state respectively providing a connection and a disconnection between (i) said first telephone line and (ii) any one of said user interface, said first recording/reproducing means and said second recording/reproducing means, and a second circuit interface means for connection to a second telephone line and for being placed selectively into a closed state or an open state, said second circuit interface means in said closed state and said open state respectively providing a connection and a disconnection between (i) said second telephone line and (ii) any one of said user interface, said first recording/reproducing means and said second recording/reproducing means; and (e) control means for (1) controlling said first circuit interface means to occupy said closed state in response to a telephone call received via said first circuit interface means (2) controlling digital recording of a voice signal on said second recording/reproducing means when said second circuit interface means is placed in said closed state in response to a telephone call received via said second circuit interface means while said first circuit interface means is in said closed state and said first recording/reproducing means operates to perform recording, in analog form, of a voice signal received via said first one of said circuit interface means and (3) converting said voice signal digitally recorded on said second recording/reproducing means into an analog signal and providing said analog signal to said first recording/reproducing means.

6. An automatic telephone message management apparatus as claimed in claim 5, further comprising:

display means for displaying an indication of reception of a telephone call via one of said first and second telephone lines under control of said control means.

7. An automatic telephone message management apparatus comprising:

(a) first recording/reproducing means for performing analog recording and reproducing of a voice signal;

(b) second recording/reproducing means for digitally recording a voice signal and for reproducing the digitally recorded voice signal;

(c) a user interface to enable communication between a user and a caller over a telephone line;

(d) a plurality of circuit interface means including:

a first circuit interface means for connection to a first telephone line and for being placed selectively into a closed state or an open state, said first circuit interface means in said closed state and said open state respectively providing a connection and a disconnection between (i) said first telephone line and (ii) any one of said user interface, said first recording/reproducing means and said second recording/reproducing means, and a second circuit interface means for connection to a second telephone line and for being placed selectively into a closed state or an open state, said second circuit interface means in said closed state and said open state respectively providing a connection and a disconnection between (i) said second telephone line and (ii) any one of said user interface, said first recording/reproducing means and said second recording/reproducing means;

(e) telephone-message-management-mode setting means for setting, in response to a mode setting input, a mode for performing a telephone message management operation to manage reception of a telephone call on at least one of said first and second telephone lines;

said first recording/reproducing means performing analog recording and reproducing of a voice signal received via said first telephone line connected to said first circuit interface means; and said second recording/reproducing means sending out a digitally recorded voice signal to said second telephone line connected to said second circuit interface means; and (f) control means for (1) controlling said first circuit interface means to occupy said closed state in response to a telephone call received via said first circuit interface means (2) controlling digital recording of a voice signal on said second recording/reproducing means when said second circuit interface means is placed in said closed state in response to a telephone call received via said second circuit interface means while said first circuit interface means is in said closed state, (3) converting said voice signal digitally recorded on said second recording/reproducing means into an analog signal and providing said analog signal to said first recording/reproducing means and (4) controlling actuation of said first recording/reproducing means and said second recording/reproducing means in response to said mode setting input to said telephone-message-management-mode setting means.

8. An automatic telephone message management apparatus as claimed in claim 7, further comprising:

display means for displaying an indication of reception of a telephone call via one of said first and second telephone lines under control of said control means.

9. An automatic telephone message management apparatus comprising:

(a) first recording/reproducing means for performing analog recording and reproducing of a voice signal;

(b) second recording/reproducing means for digitally recording a voice signal and for reproducing the digitally recorded voice signal;

(c) a user interface including a handset to enable communication between a user and a caller over a telephone line;

(d) a plurality of circuit interface means including:

a first circuit interface means for connection to a first telephone line and for being placed selectively into a closed state or an open state, said first circuit interface means in said closed state and said open state respectively providing a connection and a disconnection between (i) said first telephone line and (ii) any one of said user interface, said first recording/reproducing means and said second recording/reproducing means, and a second circuit interface means for connection to a second telephone line and for being placed selectively into a closed state or an open state, said second circuit interface means in said closed state and said open state respectively providing a connection and a disconnection between (i) said second telephone line and (ii) any one of said user interface, said first recording/reproducing means and said second recording/reproducing means;

(e) hook sensing means for sensing an off-hook state of said handset and providing an output signal indicating existence of said off-hook state;

(f) priority response means for controlling, in accordance with a predetermined priority response procedure, placing of only a predetermined one of said first and second circuit interface means into said closed state in response to said output signal of said hook sensing means when telephone calls are simultaneously received by said first and second circuit interface means;

(g) a key input section having a key which sets beforehand said predetermined priority response procedure; and (h) control means for (1) controlling, when a telephone call is received via the one of the first and second telephone lines that is connected to the other one of said first and second circuit interface means while said predetermined one of said first and second circuit interface means is placed in said closed state by said priority response means, (i) placing of said other one of said first and second circuit interface means into said closed state in response to a telephone call received via said other one of said first and second circuit interface means and (ii) digital recording of a voice signal in said second recording/reproducing means and (2) converting said voice signal digitally recorded on said second recording/reproducing means into an analog signal and providing said analog signal to said first recording/reproducing means.

10. An automatic telephone message management apparatus as claimed in claim 9, further comprising:

display means for displaying an indication of reception of a telephone call via one of said first and second telephone lines under control of said control means.

11. An automatic telephone message management apparatus comprising:

(a) first recording/reproducing means for performing analog recording and reproducing of a voice signal;

(b) second recording/reproducing means for digitally recording a voice signal and for reproducing the digitally recorded voice signal;

(c) a user interface to enable communication between a user and a caller over a telephone line;

(d) a plurality of circuit interface means including:

a first circuit interface means for connection to a first telephone line and for being placed selectively into a closed state or an open state, said first circuit interface means in said closed state and said open state respectively providing a connection and a disconnection between (i) said first telephone line and (ii) any one of said user interface, said first recording/reproducing means and said second recording/reproducing means, and a second circuit interface means for connection to a second telephone line and for being placed selectively into a closed state or an open state, said second circuit interface means in said closed state and said open state respectively providing a connection and a disconnection between (i) said second telephone line and (ii) any one of said user interface, said first recording/reproducing means and said second recording/reproducing means;

(e) telephone-message-management-mode setting means for setting a mode of performing a telephone message management operation in response to reception of a telephone call on at least one of said first and second telephone lines; and (f) control means for (1) controlling, in response to (i) setting of said telephone message management mode, (ii) said first circuit interface means being in said closed state and (iii) said second circuit interface means receiving a telephone call while said first circuit interface means is in said closed state, actuation of said second recording/reproducing means for digitally recording a voice signal received via said second circuit interface means and (2) converting said voice signal digitally recorded on said second recording/reproducing means into an analog signal and providing said analog signal to said first recording/reproducing means.

12. An automatic telephone message management apparatus as claimed in claim 11, wherein:

said control means waits to provide said analog signal to said first recording/reproducing means until all of said circuit interface means are in said open state.

13. An automatic telephone message management apparatus as claimed in claim 11, wherein:

in response to (i) setting of said telephone message management mode, (ii) said first circuit interface means being in said closed state and (iii) said second circuit interface means receiving a telephone call while said first circuit interface means is in said closed state, said control means controls said second recording/reproducing means to provide said analog signal converted from the digitally recorded voice signal to said second circuit interface means and said second recording/reproducing means operates to digitally record a voice signal received via said second circuit interface means.

14. An automatic telephone message management apparatus as claimed in claim 12, wherein:

in response to (i) setting of said telephone message management mode, (ii) said first circuit interface means being in said closed state and (iii) said second circuit interface means receiving a telephone call while said first circuit interface means is in said closed state, said control means controls said second recording/reproducing means to provide said analog signal converted from the digitally recorded voice signal to said second circuit interface means and said second recording/reproducing means operates to digitally record a voice signal received via said second circuit interface means.

* * * * *